United States Patent [19]
Long et al.

[11] 3,739,559
[45] June 19, 1973

[54] TRANSMISSION FOR FORAGE HARVESTERS AND THE LIKE

[75] Inventors: William D. Long; Ferol S. Fell; Bernard L. Wells; John P. Prichard, all of Hesston, Kans.

[73] Assignee: Hesston Corporation, Hesston, and Field Queen Incorporated, Maize, both of Kans., part interest to each

[22] Filed: Feb. 4, 1972

[21] Appl. No.: 223,441

Related U.S. Application Data

[62] Division of Ser. No. 107,090, Jan. 18, 1971, Pat. No. 3,670,590.

[52] U.S. Cl. .............................. 56/13.9, 146/107 L
[51] Int. Cl. ............................................ A01d 55/26
[58] Field of Search ........................... 56/13.9, 14.3; 146/107 L, 107 T, 119, 120

[56] References Cited
UNITED STATES PATENTS

| | | |
|---|---|---|
| 3,523,411 | 8/1970 | Waldrop et al. ..................... 56/344 |
| 2,651,162 | 9/1953 | Whisler ............................... 56/13.9 |
| 345,078 | 7/1886 | Silberzahn .......................... 146/120 |
| 1,296,485 | 3/1919 | Dick ................................ 146/107 L |
| 1,363,445 | 12/1920 | Virtue .............................. 146/107 L |

*Primary Examiner*—Russell R. Kinsey
*Attorney*—Schmidt, Johnson, Hovey & Williams

[57] ABSTRACT

A transmission on a forage harvester permits the gathering chains, sickle, and feed rolls thereof to be selectively shifted into forward, neutral, or reverse drive conditions without affecting the operation of the power source, chopper, and blower of the harvester. Components of the transmission are operably coupled in such a manner that the rotative speeds of the feed rolls may be varied relative to the chopper without correspondingly varying the speeds of operation of the sickle and gathering chains, and rockable shifter mechanism journaling the input shaft of the transmission is geometrically arranged such that the transmission tends to remain in its forward drive condition.

3 Claims, 10 Drawing Figures

PATENTED JUN 19 1973

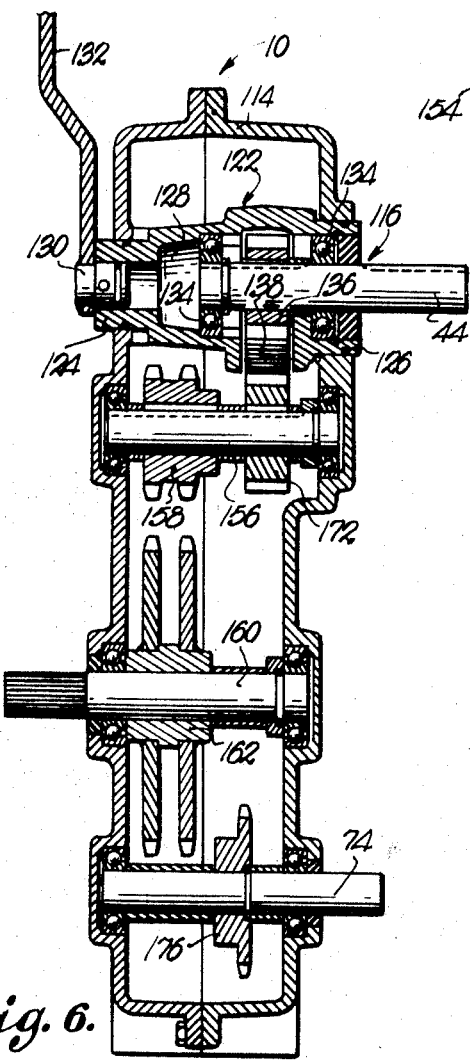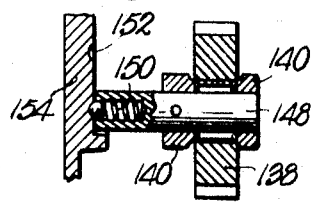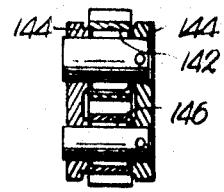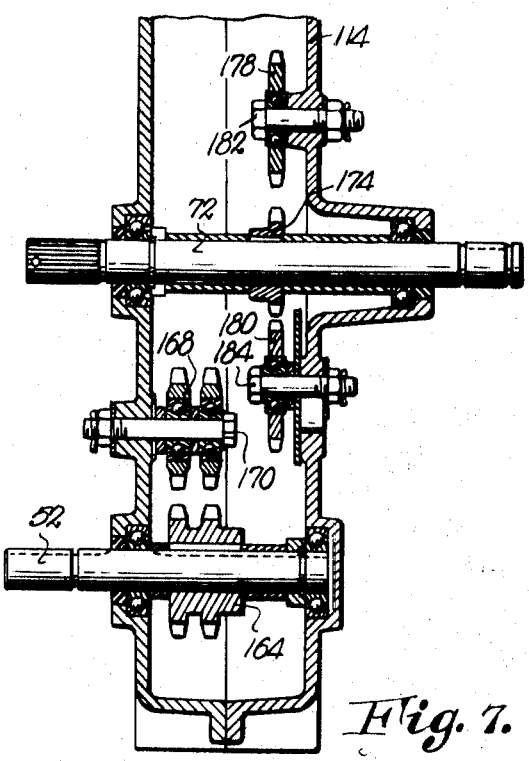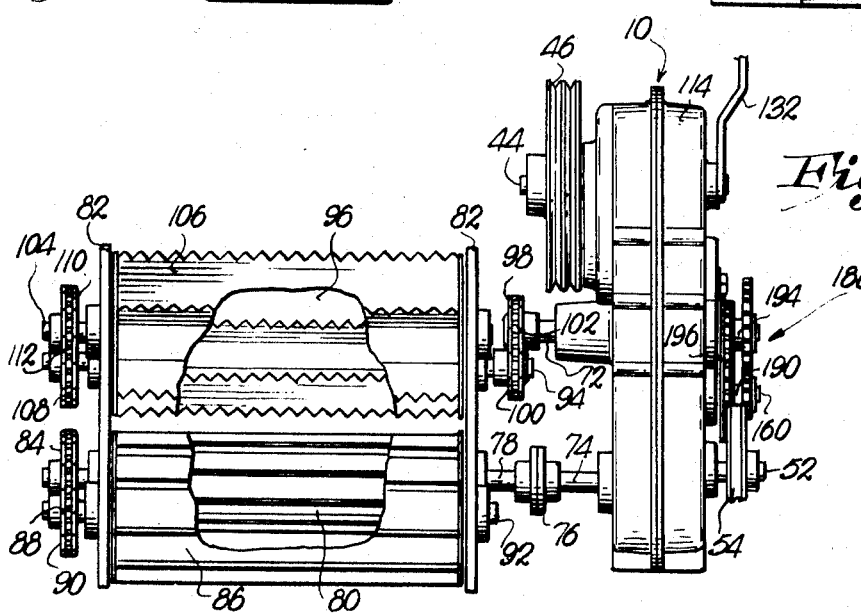

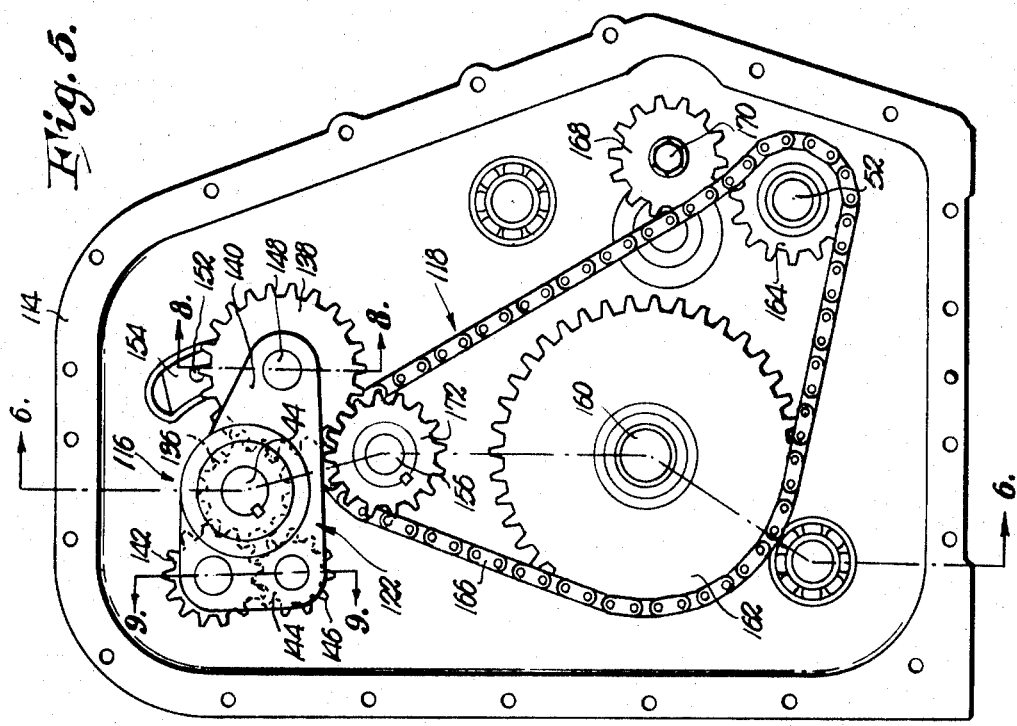
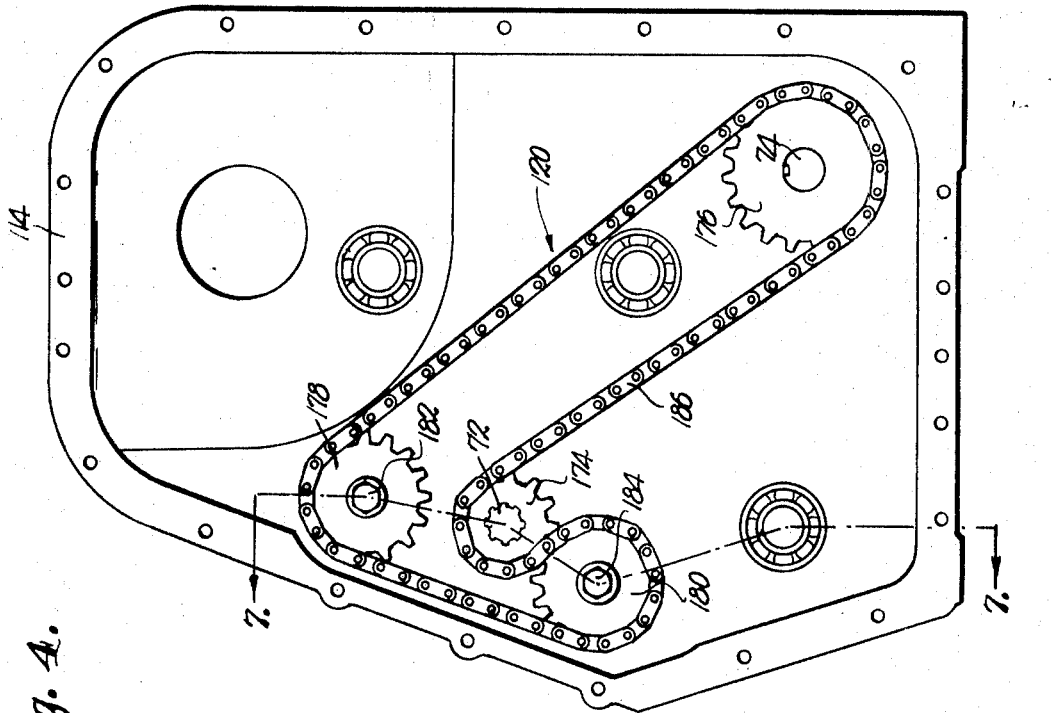

TRANSMISSION FOR FORAGE HARVESTERS AND THE LIKE

This is a division of copending application Ser. No. 107,090, filed Jan. 18, 1971, now U.S. Pat. No. 3,670,590 issued June 20, 1972.

An important object of the present invention is to provide a transmission for use in an agricultural implement, such as a forage harvester, which is designed to permit the selection of forward, neutral, and reverse feed roll directions without interrupting the continuous operation of the engine, hopper, and blower of the implement.

Another important object of the instant invention is the provision of novel shifter apparatus within the transmission which tends, by means of the special construction and geometrical relationship of its associated parts, to maintain the transmission in a forward drive condition.

A further important object of the invention is to provide a transmission as aforesaid for varying the speeds of rotation of the feed rolls relative to the chopper to thereby control the lengths of crop segments emanating from the chopper, all without causing corresponding changes in the respective speeds of operation of the sickle and gathering chains.

In the drawings:

FIG. 3 is a fragmentary, front elevational view of the transmission and feed rolls of the harvester, the front feed rolls being partially broken away to reveal the location of the rear feed rolls;

FIGS. 4 and 5 are enlarged, elevational views of opposite halves of the interior of the transmission;

FIG. 6 is a fragmentary cross-sectional view through the assembled transmission taken along line 6—6 of FIG. 5, the drive chains being removed for clarity;

FIG. 7 is a fragmentary, cross-sectional view of the assembled transmission taken along line 7—7 of FIG. 4 with the drive chains removed;

FIG. 8 is an enlarged, fragmentary, cross-sectional view taken along line 8—8 of FIG. 5 and illustrating the spring-loaded locking unit for the shifter apparatus; and FIG. 9 is an enlarged, fragmentary, cross-sectional view through the shifter apparatus taken along line 9—9 of FIG. 5.

Figure 1:
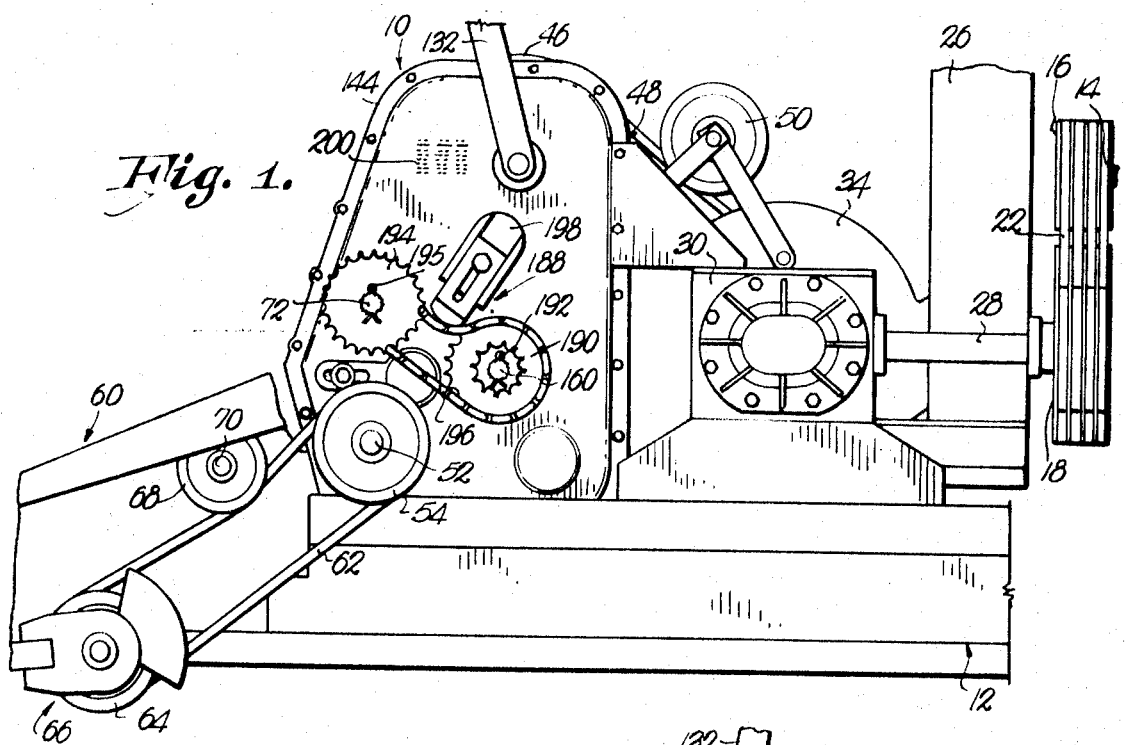
FIG. 1 is a fragmentary, side elevational view of the transmission mounted on the forward portion of a self-propelled forage harvester.
Figure 2:
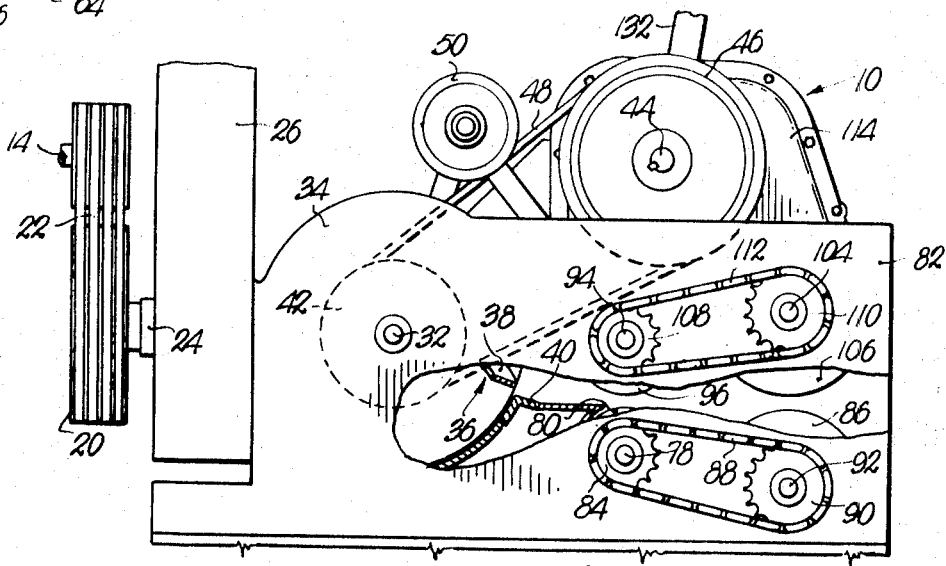
FIG. 2 is a fragmentary, elevational view of the transmission taken from the opposite side of the forage harvester.
Figure 1A:
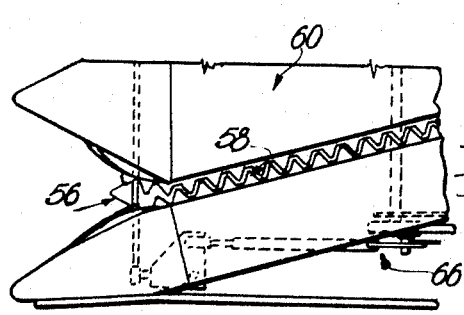
FIG. 1a is a fragmentary, top plan view of the header of the harvester on a slightly reduced scale.

Viewing initially FIGS. 1, 1a and 2, the transmission 10 of the present invention is mounted, by way of example, on the frame 12 of a self-propelled forage harvester. As will hereinafter become abundantly clear, the transmission 10 is not limited for use on forage harvesters of the self-propelled type, and in fact, may be used with ease on other types of farm implements having similar transmission requirements.

A horizontal drive shaft 14 extending forwardly from the engine (not shown) of the harvester supplies driving power to the components of the harvester forwardly of the engine by means of three triangularly disposed pulleys 16, 18 and 20 which are interconnected by a plurality of narrow belts 22. Pulley 20 (FIG. 2) is secured to the shaft 24 extending fore-and-aft of the harvester which drives a blower (not shown) within housing 26. On the opposite side of the harvester (FIG. 1), a shaft (not shown) within a fore-and-aft extending tube 28 drivingly interconnects the pulley 18 and right-angle gearbox 30 carried by the frame 12.

A horizontal, laterally extending shaft 32 (FIG. 2) projects from gearbox 30 at right angles to tube 28 into chopper housing 34 which communicates at its rearmost end with the blower housing 26, the shaft 32 forming the axle of chopper 36 preferably having six elongated cutter blades 38 (one only being shown) which cooperate during rotation with a shear bar 40. A pulley 40 affixed to shaft 32 between gearbox 30 and housing 34 is operably coupled with the input shaft 44 of transmission 10 by means of a large pulley 46 on shaft 44 and a pair of flexible belts 48, there being a spring-biased tensioning idler 50 in engagement with belt 48 along the upper stretch thereof between pulleys 42 and 46.

An output shaft 52 (FIG. 1) extending from transmission 10 adjacent the lower front corner thereof carries a pulley 54 which drives both the sickle 56 (FIG. 1a) and fore-and-aft extending gathering chains 58 of header 60. A flexible belt 62 is looped about pulley 54 and a pulley 64 of a bell crank assembly 66 connected to sickle 56 for reciprocating the latter across the path of travel of the harvester, and a pulley 68 engaging the belt 62 along the upper stretch thereof is carried by a horizontal, laterally extending shaft 70 which, in turn, is operably coupled by means not shown with the gathering chains 58.

Extending from the opposite side of transmission 10 are a pair of horizontally disposed output shafts 72 and 74 which are shown most clearly in FIG. 3. A coupling 76 joins the shaft 74 with the shaft 78 of the lower rear feed roll 80 disposed between a pair of upstanding walls 82 which extend forwardly of the chopper housing 34, the shaft 78 being journaled by the walls 82 and carrying a sprocket wheel 84 (also see FIG. 2). Lower rear feed roll 80 in turn drives a lower front feed roll 86 by means of a flexible chain 88 which engages a sprocket wheel 90 affixed to the shaft 92 of front roll 86, the shaft 92 likewise being journaled for rotation by walls 82.

The output shaft 72 is disposed slightly forwardly of output shaft 74 and is operably coupled with the shaft 94 of the upper rear feed roll 96 by means of a pair of sprocket wheels 98 and 100 having a flexible drive chain 102 entrained thereabout. The shaft 94 is journaled by walls 82 in a disposition to place the upper roll 96 in spaced opposition to lower roll 80 and extends beyond left wall 82 viewing FIG. 3 to drive the shaft 104 of upper front roll 106 by means of a pair of sprocket wheels 108 and 110 having a flexible chain 112 entrained thereabout. Shaft 104 is also journaled by walls 82 to dispose the front roll 106 in vertically spaced, opposed relationship with lower front roll 86.

Viewing FIG. 2, it may be seen that the front rolls 86 and 106 are larger in outside diameter than the rear rolls 80 and 96, while the sprocket wheels 90 and 110 are likewise greater in diameter than the sprocket wheels 84 and 108. Additionally, the space between front rolls 86 and 106 is substantially horizontally aligned with the space between rear rolls 80 and 96, providing an entry to the chopper 36. Viewing FIG. 3, it may be seen that the upper rolls 106 and 96 have irregular outermost edges in contrast to the relatively even, outermost edges of the lower rolls 86 and 80.

The working components of the transmission 10 are primarily contained within a housing 114 comprising a pair of separate, upstanding casings which are belted or otherwise suitably fastened together around their outermost edges. As shown clearly in FIGS. 4 and 5, the interior of housing 114 contains three basic, separate assemblies, the first of these being a shifter assembly 116 in the upper portion of housing 114 in FIG. 5, a double chain and sprocket output assembly 118 shown operably coupled with shifter assembly 116 in FIG. 5, and a single chain and sprocket output assembly 120 illustrated in the opposite half of the housing 114 in FIG. 4.

With specific reference to FIGS. 5 and 6 the shifter assembly 116 having an elongated rocker 122 having integrally formed therewith a pair of laterally projecting hubs 124 and 126 which are rotatably carried by the opposing halves of the housing 114 to permit swinging of rocker 122 about a horizontal axis. Rocker 122 has a transversely extending bore 128 therethrough which fixedly receives the stub shaft 130 of a vertically extending shifter handle 132 at hub 124 for effecting swinging of the rocker 122. A pair of bearings 134 within bore 128 support the input shaft 44 for rotation relative to rocker 122 about a horizontal axis common with the axis of rotation of rocker 122.

A small gear element 136 is keyed to the input shaft 44 within bore 128 for rotation with shaft 44 and is disposed in driving engagement with a large gear member 138 supported for rotation at one end of rocker 122 between the opposed furcations of a bifurcated wing 140. Gear element 136 is also disposed in constant driving engagement with a gear member 142 supported for rotation at the opposite end of rocker 122 by opposed furcations of a second bifurcated wing 144. A third, smaller gear member 146 is rotatably carried by wing 144 directly below gear 142 intermeshed therewith.

As shown in FIG. 5, in this arrangement of assembly 116 the gear members 138, 142 and 146 are disposed at respective corners of a triangle, with gear element 136 being located between members 142 and 138 such that the latter two members will always rotate in a direction opposite to that of element 136, while gear member 146 will always rotate in the same direction as element 136.

The shifter assembly 116 is also provided with means for selectively holding the rocker 122 in each of three rotative positions corresponding to forward, neutral and reverse. To this end, viewing FIGS. 5 and 8, the axle 148 of large gear member 138 extends laterally beyond the latter and carries a spring-loaded detent 150 when yieldably fits into a series of circumferentially spaced depressions 152 in an arcuate boss 154 on the interior wall of one of the housing sections.

The components of output assembly 118 are disposed primarily in the left half of housing 114 when FIGS. 6 and 7 are viewed. Assembly 118 includes an upper jackshaft 156 which spans the interior of housing 114 and has a double sprocket wheel 158 keyed thereto for rotation therewith (the sprocket wheel 158 being visible only in FIG. 6); an output shaft 160 which extends across the interior of housing 114 carrying a large double sprocket wheel 162 and projecting outwardly beyond the left half of housing 114; the output shaft 52 extending across and projecting outwardly beyond housing 114 with a small double sprocket wheel 164 keyed thereto for rotation therewith; and a flexible, continuous double chain 166 (shown only in FIG. 5) entrained about the sprocket wheels 158, 162 and 164 which operably couples the same with one another. A double idler sprocket wheel 168 is mounted for rotation about a stub shaft 170 and tensions the chain 166 along an upper stretch thereof as shown in FIG. 5.

A gear element 172 is keyed to the jackshaft 156 alongside of sprocket 158 in the right half of housing 114 viewing FIG. 6 and is disposed generally between the first gear member 138 and third gear member 146 in position to operably mesh with such gears when the rocker 122 is swung to opposite ends of its path of travel. In this position, gear member 138 engages element 172 in the first quadrant of the latter when rocker 122 is positioned as shown in FIG. 5, and gear member 146 engages element 172 in the fourth quadrant of the latter when rocker 122 is at the opposite end of its path of travel.

The output assembly 120 is completely separate from assembly 118 and is disposed primarily within the right half of transmission housing 114 viewing FIGS. 6 and 7. The two output shafts 72 and 74 to the feed rolls of the harvester each form a part of assembly 120 as they traverse the interior of housing 114 for rotation about respective horizontal axes. As shown in FIGS. 3 and 7, the output shaft 72 extends completely through the housing 114, projects outwardly beyond both sides of the latter, and carries the sprocket wheel 98 on the feed roll side of housing 114. Shaft 72 also has a single sprocket wheel 174 keyed thereto interiorly of housing 114 (FIGS. 4 and 7), and the shaft 74 has a slightly larger single sprocket wheel 176 also keyed thereto for rotation therewith interiorly of housing 114. Assembly 120 further includes a pair of single idler sprocket wheels 178 and 180 carried for rotation by respective stub shafts 182 and 184 and an endless, single width flexible drive chain 186 which is operably entrained about sprocket wheels 174–180 in the manner illustrated in FIG. 4.

Exteriorly of housing 114 as illustrated in FIGS. 1 and 3, the assemblies 118 and 120 are operably interconnected by variable speed control apparatus broadly designated 188 which permits the rotative speeds of the feed rolls to be varied. To accomplish this goal the apparatus 188 includes a first sprocket wheel component 190 that is detachably secured to the splined end of output shaft 160 by a cotter pin 192 extending through the shaft 160. Sprocket wheel 190 presents a pair of side-by-side tracks of differing diameter, the larger track containing 22 circumferentially spaced teeth and the smaller track having 12 teeth in the preferred embodiment. Similarly, a second sprocket wheel component 194 preferably having 14 and 24 toothed tracks is detachably secured to the splined end of output shaft 72 by a cotter pin 195, and a flexible chain 196 is selectively entrained about a chosen track on each sprocket wheel 190 and 194. A tensioning unit 198 is mounted on the housing 114 for movement toward and away from chain 196 to permit the latter to be loosened for removal and interchanging of sprocket wheels 190 and 194.

OPERATION

Upon the application of driving power to drive shaft 14, the chopper shaft 32 is caused to rotate in a clockwise direction viewing FIG. 2 to actuate chopper 36 and effect similar rotation of the transmission input shaft 44. Thus, during the time that drive shaft 14 is in operation, the transmission input shaft 44 and hence the gear element 136 rigid thereto are constantly rotating in a clockwise direction (viewing FIG. 5), thereby imparting counterclockwise rotation to gear member 138 and a clockwise rotation to gear member 146. With the shifter handle 132 pushed forward into the forward drive position illustrated in FIGS. 1 and 2, the rocker 122 is disposed at one end of its path of travel such that the large gear member 138 is in meshing engagement with the gear element 172 of output assembly 118, as best illustrated in FIGS. 5 and 6. This, in turn, causes gear element 172 and jackshaft 156 to rotate in a clockwise direction viewing FIG. 5, thereby imparting clockwise movement to the remaining components of output assembly 118, including output shafts 52 and 160.

At this juncture it is important to note that the special geometrical relationship of the components of shifter assembly 116 and the free-swinging relationship between rocker 122 and input shaft 44 tends to cause the assembly 116 to be maintained in a forward drive condition. More particularly, while rocker 122 and input shaft 44 are swingable and rotatable respectively about a common axis, they are movable independently of one another such that driving engagement of gear element 136 with gear members 138 and 142 imparts a clockwise moment to rocker 122 viewing FIG. 5. This necessarily tends to maintain gear member 138 in engagement with gear element 172 to thereby drive output assembly 118 in a clockwise direction as described.

Viewing the exterior of transmission 10 in FIG. 1, it may be seen that the counterclockwise rotation of output shaft 52 of assembly 118, in turn, drives the sickle 56 (FIG. 1a) in straight-line reciprocation across the path of travel of the harvester and causes shaft 70 to drive gathering chains 58 in a direction rearwardly of the harvester such that stalks of the crop severed by sickle 56 are transported toward the chopper 36. Also viewing FIG. 1, counterclockwise rotation of output shaft 160 of assembly 118 imparts similar motion to the components of control apparatus 188, thereby driving shaft 72 of output assembly 120 (FIG. 4) in a counterclockwise direction. Rotation of output shafts 72 and 74 in turn, causes counterclockwise rotation of the feed rolls 80 and 86 (viewing FIG. 2), but clockwise rotation of rolls 96 and 106. Thus, stalks which are delivered between the feed rolls from gathering chains 58 are propelled into chopper 36 and reduced to segments, with the segments thereafter being directed into blower housing 26 for air-conveyance to a trailing vehicle or the like.

Periodically it may be necessary or desirable to temporarily deactivate the sickle 56, gathering chains 58, and the feed rolls. This may be readily and easily accomplished without the need for shutting off the engine of the harvester by moving shifter handle 132 toward the rear of the harvester into a neutral position to swing gear member 138 out of engagement with gear element 172. Such rearward movement of handle 132 must be made with sufficient force to overcome the resistance of spring-loaded detent 150 (FIG. 8) which releasably holds the shifter assembly 116 in either its forward, neutral or reverse positions corresponding to the three depressions 152 in boss 154. Once the rocker 122 is swung to its neutral position, the detent 150 springs back into engagement with the middle depression 152 to yieldably hold rocker 122 and thereby maintain the feed rolls, sickle 56, and gathering chains 58 in a standby condition.

During operation of the harvester, slugs of crop material, as well as certain foreign objects, are often advanced to the feed rolls and chopper 36, tending to clog the harvester. In such situations it is extremely desirable, both from the standpoint of safety and damage prevention, to reverse the direction of the feed rolls and gathering chains 58 in order to flush out the slugs and foreign material. This may be accomplished without affecting the continued rotation of chopper 36 by moving the shifter handle 132 to its rearmost position, thereby swinging the gear member 146 on rocker 122 into meshing relationship with gear element 172. Because of the continuous clockwise rotation of gear member 146, viewing FIG. 5, the entire output assembly 118 is caused to reverse directions and move counterclockwise. Thus, the gathering chains 58 and feed rolls are also reversed to effect flushing of the rolls and the header 60.

The length of crop segments emanating from chopper 36 into blower housing 26 is directly controlled by the speed of rotation of chopper 36 relative to the speed at which stalks are fed thereinto by feed rolls 80, 86, 96 and 106. By varying the rotative speeds of the feed rolls through the transmission 10 while maintaining the chopper 36 at a constant rotational speed, the size of the crop segments can be correspondingly controlled. Moreover, because of the unique operational relationship between the separate output assemblies 118 and 120 within transmission 10, such variable speed control of the feed rolls can be carried out without changing the speed of operation of the sickle 56 and gathering chains 58.

Accordingly, it may be seen that when the transmission 10 is in gear, the output assembly 118 moves at a constant speed dependent upon the speed of rotation of drive shaft 14 and regardless of the particular combination and arrangement of the components of control apparatus 188. Thus, the output shaft 52 to the sickle 56 and gathering chains 58 remains at a constant speed. However, by placing the transmission 10 in neutral and releasing the tensioning unit 198, the sprocket wheel components 190 and 194 may be removed from shafts 72 and 160 and reversed or interchanged in order to vary the speed of output assembly 120. This, in turn, varies the speed of the feed rolls. As illustrated in FIG. 1, indicia 200 may be cast into the side of the housing 114 in order to provide the operator of the harvester with a convenient table setting forth the length of crop segment obtained for each particular arrangement of the sprockets 190 and 194. By way of example, the following data may be incorporated into such a table:

| CUT | TOP | LOW |
|---|---|---|
| 3/16 | 24 T | 12 T |
| ¼ | 22 T | 14 T |
| 5/16 | 24 T | 22 T |
| 7/16 | 22 T | 24 T |
| ⅝ | 14 T | 22 T |
| ¾ | 12 T | 24 T |

Thus, if the stalks are to be cut into 3/16 inch lengths, the sprocket wheels 190 and 194 should be arranged such that the 24 toothed track of sprocket wheel 194 and the 12 toothed track of sprocket wheel 190 are interconnected by chain 196, with sprocket wheel 194 on top shaft 72 and sprocket wheel 190 on low shaft 160.

It may therefore be seen that the present transmission affords an extremely advantageous means of carrying out the objects of the invention as previously set forth. Not only are the sickle, gathering chains and feed rolls able to be driven in forward, neutral, or reverse completely independently of the engine of the harvester or the chopper and blower, but also the speed of rotation of the feed rolls may be quickly and easily varied independently of all other components of the harvester. Moreover, the special construction of the shifter assembly 116 enables the transmission to be held in a forward drive condition with considerably less effort than would otherwise be necessary.

Having thus described the invention, what is claimed as new and desired to be secured by Letters Patent is:

1. In an agricultural implement having power means, the combination of:
   a rotatable chopper adapted to be operably coupled with said power means for rotation thereby;
   a sickle reciprocable across the path of travel of the implement forwardly of the chopper for severing a standing crop as the implement is advanced;
   gathering means extending fore and aft of the implement for conveying the severed crop from the sickle rearwardly toward said chopper;
   a pair of opposed, oppositely rotatable feed rolls disposed between said chopper and the gathering means for receiving the severed crop from the latter and propelling the same into the chopper; and
   a transmission interposed between said power means and the sickle, gathering means, and feed rolls and including:
   a first output shaft adapted to be drivingly coupled with said power means,
   said shaft being operably coupled with said sickle and said gathering means for driving the same;
   a second output shaft drivingly coupled with said feed rolls; and
   variable speed control apparatus operably interconnecting said shafts for driving the feed rolls at any one of a number of preselected speeds relative to the chopper without varying the speeds of operation of said sickle and said gathering means,
   said apparatus including a component on each of said shafts rotatable therewith and flexible drive means entrained about the components,
   said components each having a pair of side-by-side tracks of differing diameters adapted for selective, operable engagement with said flexible means when the latter is entrained about the components.

2. An implement as claimed in claim 1,
   said components being releasably secured to said shafts to permit interchanging and reversing thereof.

3. In a forage harvester having a crop cutter, a chopper, rolls for feeding the crop to the chopper, gathering means for advancing the cut crop to the rolls, and a power shaft coupled with said chopper, a transmission for controlling the operation of the cutter, rolls, and gathering chains independently of said chopper including:
   an input shaft coupled with said power shaft;
   a pair of separate, essentially side-by-side drive train assemblies, each including its own pair of laterally spaced apart output shafts,
   one of said output shafts of one assembly being coupled with said cutter and the gathering means,
   both of said output shafts of the other assembly being coupled with said feed rolls;
   a control unit for selectively coupling said one assembly with said input shaft to drive the one assembly in forward, neutral, and reverse directions; and
   means intercoupling the other shaft of said one assembly with one of the shafts of said other assembly for transmitting driving power to the feed rolls from said input shaft via said one assembly, said intercoupling means, and said other assembly.

* * * * *